United States Patent [19]

Neefe

[11] Patent Number: 4,459,246

[45] Date of Patent: Jul. 10, 1984

[54] MOLDING CONTACT LENSES USING A DIRECTED STREAM OF GAS

[76] Inventor: Charles W. Neefe, P.O. Box 429, 811 Scurry St., Big Spring, Tex. 79720

[21] Appl. No.: 411,662

[22] Filed: Aug. 26, 1982

[51] Int. Cl.³ .............................................. B29D 11/00
[52] U.S. Cl. ..................................... 264/2.1; 264/1.1; 264/85; 264/310; 425/808
[58] Field of Search ................... 264/1.4, 2.1, 1.1, 85, 264/500, 503, 310, 311; 425/808

[56] References Cited

U.S. PATENT DOCUMENTS

| | | | |
|---|---|---|---|
| 2,302,020 | 11/1942 | Frederick, Jr. | 264/500 |
| 3,454,686 | 7/1969 | Jones | 264/1.4 |
| 3,660,545 | 5/1972 | Wichterle | 264/1.4 |
| 3,691,263 | 9/1972 | Stoy et al. | 264/2.1 |
| 3,699,089 | 10/1972 | Wichterle | 264/2.1 |

FOREIGN PATENT DOCUMENTS 192960  11/1964  Sweden ............................... 264/500

Primary Examiner—James B. Lowe

[57] ABSTRACT

The lens is molded in a concave lens mold, the liquid lens monomer is placed in the concave mold and a controlled stream of gas is directed at the center of the liquid surface and shapes the concave lens surface upon polymerization of the monomer.

6 Claims, 2 Drawing Figures

MOLDING CONTACT LENSES USING A DIRECTED STREAM OF GAS

PRIOR ART

The molding of contact lenses dates back to the very beginning of the art. Compression molding, casting, injection molding, spin casting, and transfer molding have all been used to produce contact lenses with varying degrees of success. The bulk of lenses produced today are either made by spin casting or lathe cut and polished.

DESCRIPTION OF THE INVENTION

The present invention employs a controlled stream of gas to shape the concave lens surface. The gas is directed at the center of the liquid lens monomer and forms a concave depression by displacing the liquid away from the center. The monomer is allowed to polymerize while being held in the required shape by the force exerted on the liquid lens surface by the stream of pressurized gas. The convex lens surface is molded against the concave surface of the lens mold.

IN THE DRAWINGS

THE LENSES ARE MADE AS FOLLOWS

A source of filtered and precisely pressure regulated inert gas such as nitrogen must be provided.

The nozzle which directs the gas toward the concave lens surface should be of the transvector type as supplied by the Vortec Corporation.

The radius of the concave surface may be controlled in two ways: (1) by changing the pressure of the gas (2) by changing the distance from the cone to the lens surface.

Figure 1:
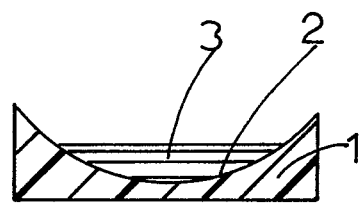
FIG. 1 shows the lens mold with the liquid monomer, in section.
Figure 2:
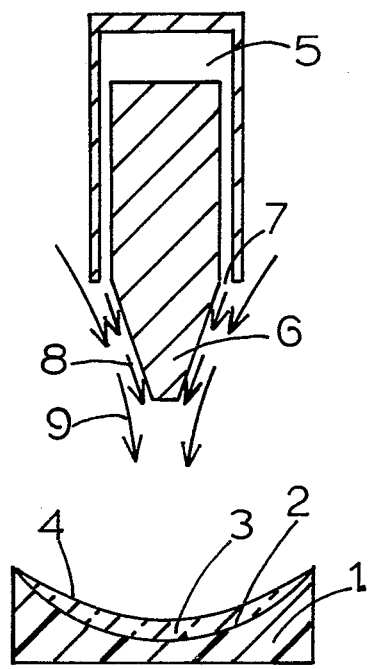
FIG. 2 shows the polymerized lens in place with the air stream on, in section.

A selected liquid lens monomer is prepared with sufficient catalyst to achieve polymerization. The liquid monomer 3 FIG. 1 is placed in the concave lens mold 1 FIG. 1 and the liquid assumes the curvature of the concave surface 2 FIG. 1. The gas nozzle 6 FIG. 2 is directed at the center of the concave lens mold 1 FIG. 2. A filtered and precisely pressure controlled inert gas is supplied to chamber 5 FIG. 1. Gas under pressure escapes through the circular gas nozzle 7 FIG. 2 around the base of the cone 6 FIG. 2. The gas 8 FIG. 2 travels toward the smaller end of the cone and increases in velocity as the cone becomes smaller in diameter. Induction and entrainment take place outside the cone area 9 FIG. 2. The gas is thus focused or condensed to a small area at the end of the cone 6 FIG. 2. The focused gas stream is directed at the center of the lens mold 1 FIG. 2 and displaces the liquid surface 4 FIG. 2 producing the required lens shape. The liquid lens monomer is allowed to polymerize to form the lens 3 FIG. 2. The convex lens surface being molded against the mold surface 2 FIG. 2 and the concave lens surface being formed by the inert gas, displacing the liquid and forming the concave surface 4 FIG. 2. The finished lens is removed from the mold for final inspections.

Gas shaping of the concave surface may be used in combination with spin casting to achieve better control of the concave curvature. Small ripples have been seen on the concave surface of the lens monomer during the beginning stages of polymerization. These ripples on the monomer are due to gas currents and they totally disappear as polymerization proceeds and the viscosity of the monomer increases and becomes a solid.

The stream of compressed gas may be directed away from the center and toward the edge of a spin cast lens through multiple gas nozzles to control the peripheral curvature. Spin cast lenses have an aspheric concave surface having a longer radius toward the edge which may be altered to a sphere by directing compressed gas toward the revolving peripheral area of the lens. This may also be accomplished by multiple streams or a ring of gas directed toward the periphery of the revolving lens.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of molding a contact lens having a convex surface molded against a concave lens mold and the concave lens surface shaped by a stream of compressed gas released through a nozzle and directed at the liquid monomer and the gas pressure displaces the liquid lens monomer to form the concave lens surface and allowing the liquid monomer to polymerize and form a solid contact lens.

2. A method of molding a contact lens as in claim 1 wherein the compressed gas is directed at the center of the lens.

3. A method of molding a contact lens as in claim 1 wherein the lens is rotated around the lens optical axis while the lens is being gas molded.

4. A method of molding a contact lens as in claim 1 wherein the lens is rotated around the lens optical axis and the compressed air is directed at a point other than the lens center.

5. A method of molding a lens as in claim 4 wherein multiple gas nozzle are used.

6. A method of molding a lens as in claim 4 wherein a circular gas nozzle is used.

* * * * *